United States Patent [19]

Oka et al.

[11] Patent Number: 4,876,527

[45] Date of Patent: Oct. 24, 1989

[54] VEHICLE SPEED DETECTING DEVICE

[75] Inventors: Hiroki Oka, Toyota; Nobuyoshi Nagura, Anjo, both of Japan

[73] Assignee: Aisin Seiki Kabushiki Kaisha, Aichi, Japan

[21] Appl. No.: 250,899

[22] Filed: Sep. 29, 1988

[30] Foreign Application Priority Data

Sep. 29, 1987 [JP] Japan .................. 62-245627

[51] Int. Cl.⁴ .............................................. B60Q 1/00
[52] U.S. Cl. .................................... 340/441; 340/670;
340/671; 180/170; 180/197; 303/92; 303/94;
324/160; 364/565; 361/236; 361/242
[58] Field of Search ............... 340/52 R, 53, 669–672,
340/441; 180/170, 171, 197, 282; 303/91, 92,
94, 102, 95; 364/426, 565, 426.01, 426.02,
426.04; 324/500, 160, 161, 163; 361/236–239,
240, 242; 235/95 R, 95 A

[56] References Cited

U.S. PATENT DOCUMENTS

| | | | |
|---|---|---|---|
| 3,950,700 | 4/1976 | Weisbart | 340/671 |
| 4,125,295 | 11/1978 | Ruhnau et al. | 340/671 |
| 4,125,825 | 11/1978 | Takeuchi et al. | 340/670 |
| 4,783,631 | 11/1988 | Nakashima et al. | 340/52 R |

Primary Examiner—Donnie L. Crosland
Attorney, Agent, or Firm—Sughrue, Mion, Zinn, Macpeak & Seas

[57] ABSTRACT

A vehicle speed detecting device utilizes two vehicle speed pulse generators, a vehicle speed memory device, pulse counters, abnormality detectors, pulse signal transfer devices and an alarm device which are all integrated into the electronic control circuit of a microprocessor through two sets of signal processing devices. The detecting device not only indicates the speed of the vehicle but also detects abnormalities in either of the vehicle speed pulse generators and provides an appropriate alarm.

2 Claims, 5 Drawing Sheets

VEHICLE SPEED DETECTING DEVICE

The present invention is directed to a vehicle speed detecting device and more specifically to a vehicle speed detecting device utilizing two vehicle speed pulse generators for providing pulses indicative of vehicle speed in the event one of the generator malfunctions.

BACKGROUND OF THE INVENTION

Vehicles may be equipped with a speedometer for indicating the vehicle speed to the driver, a prefixed speed control device for operating the vehicle at a designated speed, an automatic gear change assembly, an anti-skid control device, other electrical devices which augment and control the vehicles operation and a vehicle speed pulse generator which generates one electrical pulse per rotation of a shaft of a vehicle through a small angle. Electrical pulses may be converted into an analog vehicle speed signal by means of an F/V convertor or may be converted into a digital signal by counting the number of electrical pulses generated in a specified time and calculating the cycle of the electrical pulse, thus obtaining overall vehicle speed information. For the vehicle speedometer, one end of a cable is connected to the output axis of a transfer unit while the other end is connected to a generator or rotary encoder. There are many different types of rotary encoders such as a slit type rotator comprised of a light transparent window or a light reflector which may be detected by a photosensor or one utilizing magnetically sensitive material such as a switch or pick up coil located adjacent a rotating permanent magnet. There is also a possibility to have the output axis of the vehicle transmission connected to a rotary encoder which is separate from the vehicle speedometer cable. In any case, when the vehicle pulse generator malfunctions due to a problem such as a cut wire, a short circuit or the like, the vehicle speed indicator or vehicle related controls will also malfunction. In the past two sets of vehicle pulse generators were provided and the vehicle speed was calculated by the electrical pulses generated by each pulse generator and the comparison was made of the pulses. When the difference exceeded a certain level, the vehicle speed generator which generated the lower vehicle speed pulse was considered abnormal and an alarm was activated.

Assuming one of the vehicle speed pulse generators is connected with the photosensor type rotary encoder and the other vehicle speed pulse generator is connected with a permanent magnet type rotary encoder, it is well known that when the vehicle operates at very low speeds the latter would not generate a substantial pulse while the former would generate a pulse. It has been determined that the pulse was not generated by the permanent magnet type rotary encoder at lower speeds, especially during the start up stage, due to a disturbance imposed upon the rotation of the permanent magnet by the magnetic flux of the permanent magnet especially in combination with a pick up coil wherein the inductive potential of the pick up coil at extremely low speeds of rotation is so low that a pulse is not detected. As a result a false signal of abnormality would arise and the present invention is designed to prevent the occurrence of such false abnormality signals.

SUMMARY OF THE INVENTION

The present invention provides a new and improved vehicle speed detecting device having first and second vehicle speed pulse generators, each of wich generates one electrical pulse per rotation of the vehicle shaft through a specific small angle of rotation. A vehicle speed calculation method is provided which calculates the vehicle speed based on electrical pulses being generated by one of the vehicle speed pulse generators. When the first and second vehicle speed pulse generators are normal and the vehicle speed exceeds a predetermined value, electrical pulses are generated at the same frequency by both pulse generators which are proportionate to the rotating speed of a vehicle wheel.

Counting means counts the pulses of one vehicle speed pulse generator and if the count value exceeds a specified value while the other vehicle speed pulse generator generates the specified number of pulses, the abnormality detecting means will not generate abnormality information.

Memory means will memorize and store the vehicle speed information which is calculated by the vehicle speed calculation means based on electrical pulses generated by one vehicle speed pulse generator. If one vehicle speed pulse generator is in trouble, electrical pulses are not generated despite the vehicle speed exceeding the predetermined value and therefore the count value will be "0" while a specified number of pulses is generated by the other vehicle speed pulse generator. In other words, the value becomes lower than the specified value and thus the abnormality detecting means generates an abnormality signal which in turn activates alarm means.

Transfer means will transfer the electrical pulse which is needed for vehicle speed calculation from one generator to the other based on which the vehicle speed is calculated and the memory means will memorize the vehicle speed information. Thus, even if one of the vehicle speed pulse generators is found to be abnormal and an abnormality signal is provided, the memory means will memorize the correct vehicle speed which is calculated based upon the electrical pulses generated by the other vehicle speed pulse generator. This vehicle speed information from the memory means is utilized as vehicle speed feedback data for a predetermined operating speed control, gear transmission control or anti-skid brake pressure control and normal operation is continued despite the problems associated with one vehicle speed pulse generator. When the vehicle speed is lower than a predetermined value, even if one or both of the first and second vehicle speed pulse generators is equipped with a permanent magnet type rotary encoder, no electrical pulse will be generated and no abnormality signal will be initiated even if the speed exceeds the predetermined vehicle speed.

The foregoing and other objects features and advantages of the invention will be apparent from the following more particular description of preferred embodiments of the invention as illustrated in the accompany drawings.

DETAILED DESCRIPTION OF THE INVENTION

Figure 1:
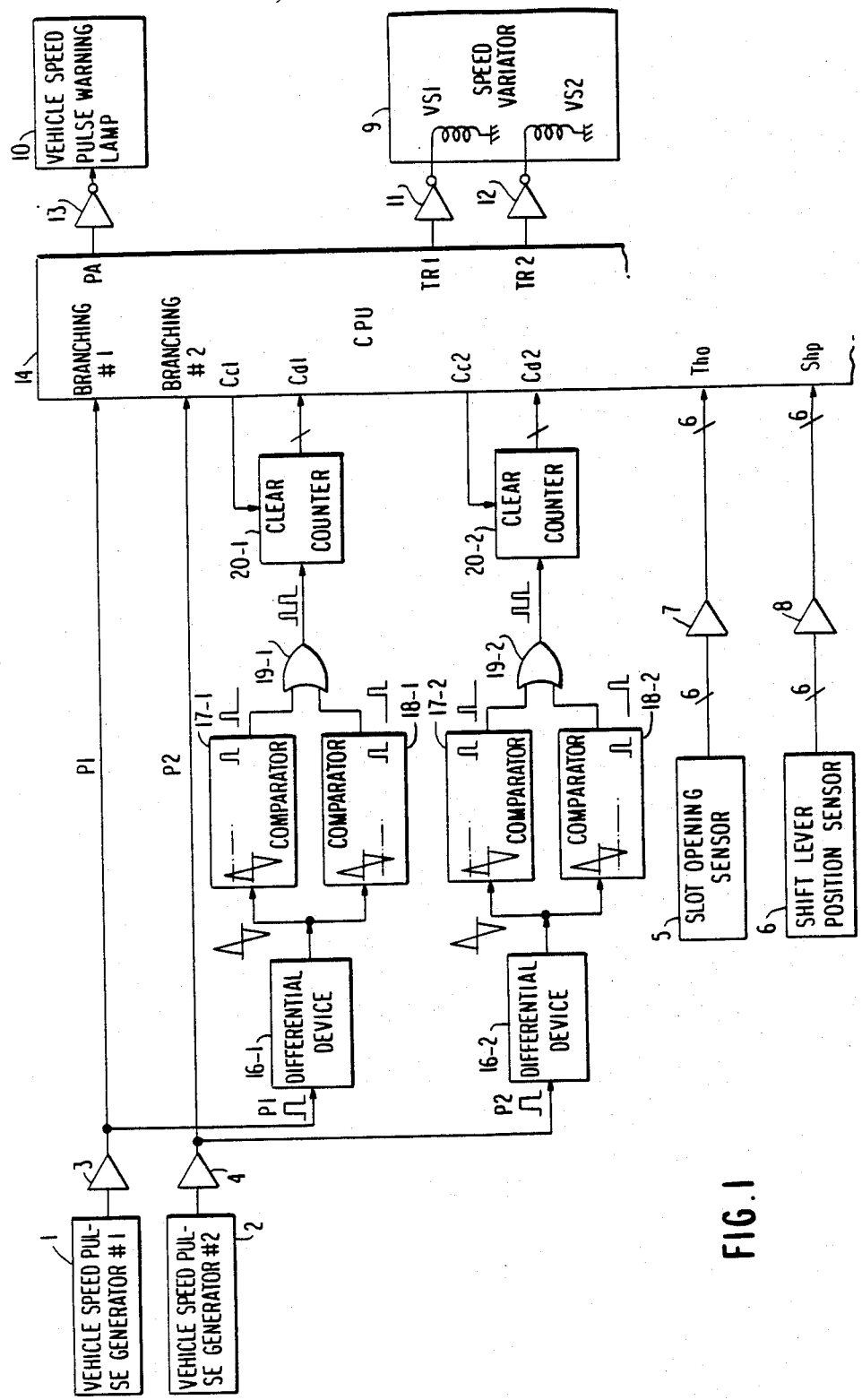
FIG. 1 is a schematic block diagram of the vehicle speed detecting device according to the present invention.

FIG. 1 shows a preferred embodiment of the present invention. According to this embodiment, the counting method counts the generated pulses P1 of the first vehicle speed pulse generator 1 while the second vehicle speed pulse generator 2 generates a specified number of pulses and the second vehicle speed pulse generator 2 and the counter 20-2 counts the generated pulses while the first vehicle speed pulse generator 1 and the pulse counter 20-1 generates the specified number of pulses. The vehicle speed counting method, the memory method, the abnormality detecting method, and the transfer method are all integrated in a microprocessor CPU which conducts variable speed control. The CPU generates a first abnormality information when the counted value of the first counter 20-1 become "0", generates a second abnormality information when the counter value of the second counter 20-2 become "0" and when the first abnormality information is generated, the vehicle speed information is transferred from the information calculated based on pulse P1 of the first vehicle speed pulse generator 1 to the information calculated based on the pulses P2 being generated from the second vehicle speed pulse generator P2. When the second abnormality information is generated, the vehicle speed information is that calculated from the pulses P2 being generated by the second vehicle speed pulse generator and is now transferred and exchanged with the information calculated from the pulses P1 generated by the first vehicle speed pulse generator. When the count value of the first counter 20-1 is higher than 1, the first abnormality information is erased and when the count value of the second counter 20-2 is higher than 1, the second abnormality information is erased.

The vehicle speed pulse generator 1 is a rotary encoder of the permanent magnet type, which is coupled to the vehicle speedometer cable; the vehicle speed pulse generator 2 is a rotary encoder of photo sensor type having a rotating split plate which is connected to the output axis of a transmission (not shown) and the electrical pulses generated by both generators are first amplified and wave-shape rectified at 3 and 4 respectively. The pulse P1 generated by the generator 1 is fed into the input port of the branch 1 of the CPU 14 and into the differential device 16-1. The pulse P2 generated by the generator 2 is fed into the input port of the branch 2 of CPU and into the differential device 16-2. The vehicle speed pulse generators 1 and 2 generate equal numbers of electrical pulses per rotation of the vehicle wheel.

The differential devices 16-1 and 16-2 generate a positive peak at the rising points of pulses P1 and P2 and generate a differentiated pulse of negative peak at the declining points of each pulse. The comparator 17-1 generates one pulse at the positive peak of pulse P1 and the comparator 18-1 generates one pulse at the negative peak of pulse P1. The pulses generated by the comparators 17-1 and 18-1 are fed into the pulse counter input terminal of the first counter 20-1 through the OR gate 19-1. Based on these operational sequences of the electrical circuit elements, one pulse P1 become two pulses at the first counter 20-1. In other words, the differential devices 16-1 and the OR gate 19-1 are installed to gain pulses. Similarly, the comparator 17-2 generates one pulse at the positive pulse of pulse P2 and the comparator 18-2 generates one pulse at the negative peak of pulse P2. These pulses generated by the comparator 17-2 and the comparator 18-2 are fed into the count pulse counter input terminal of the second counter 20-2.

The counted data Cd1 of the first counter 20-1 are read by CPU 14 in every A numbers of the second pulse P2 are generated, and the counter 20-1 is instantly cleared to be used for the next counting (for restart).

Similarly, the counted data Cd2 of the second counter 20-2 is also fed and read by CPU 14 for every A number of the first pulses P1 generated as explained hereinafter and the counter 20-2 is instantly cleared to be used for the next counting.

The throttle opening sensor 5 which is connected to the throttle valve of the vehicle engine (not shown), is an absolute encoder and produces data which indicates the degree of opening. This data signal is fed into data input port Th-0 of CPU 14 upon amplification and wave-shape rectification via the amplifier 7. The shift position of a shift lever (not shown) which is connected to the vehicle transmission 9 is detected by the shift lever position sensor 6. The sensor 6 is composed of several switches and generates signals showing the shift lever position. This data signal is fed into the data input port Sh-p of CPU 14 upon amplification and wave-shape rectification by the amplifier 8.

The CPU 14 sporadically sends L output to the output port PA when any abnormality is detected in the vehicle speed pulse generator 1 or 2 during a control operation described hereinafter. The amplifier 13 upon receipt of L input, energizes the vehicle speed pulse warning lamp 10 which is lit or shut off by this action.

The speed variator 9 includes two solenoid valves required for the speed phase positioning and it determines the speed phase by the shift lever positioning and combination of openings and closing. The CPU 14 determines the speed phase for the speed variator based on the vehicle speed information, through opening level, and shift lever position, prepares data for directing "ON" and "OFF" to solenoid VS 1 and VS 2 responsive to the speed shift, and referred to the output port TR 1 and TR 2, at the timing responsive to operational condition of the speed variator.

When L is fed to TR 1, solenoid VS 1 is energized by the amplifier 11 and when L is fed to TR 2, solenoid VS 2 is energized by the amplifier 12.

Figure 2:
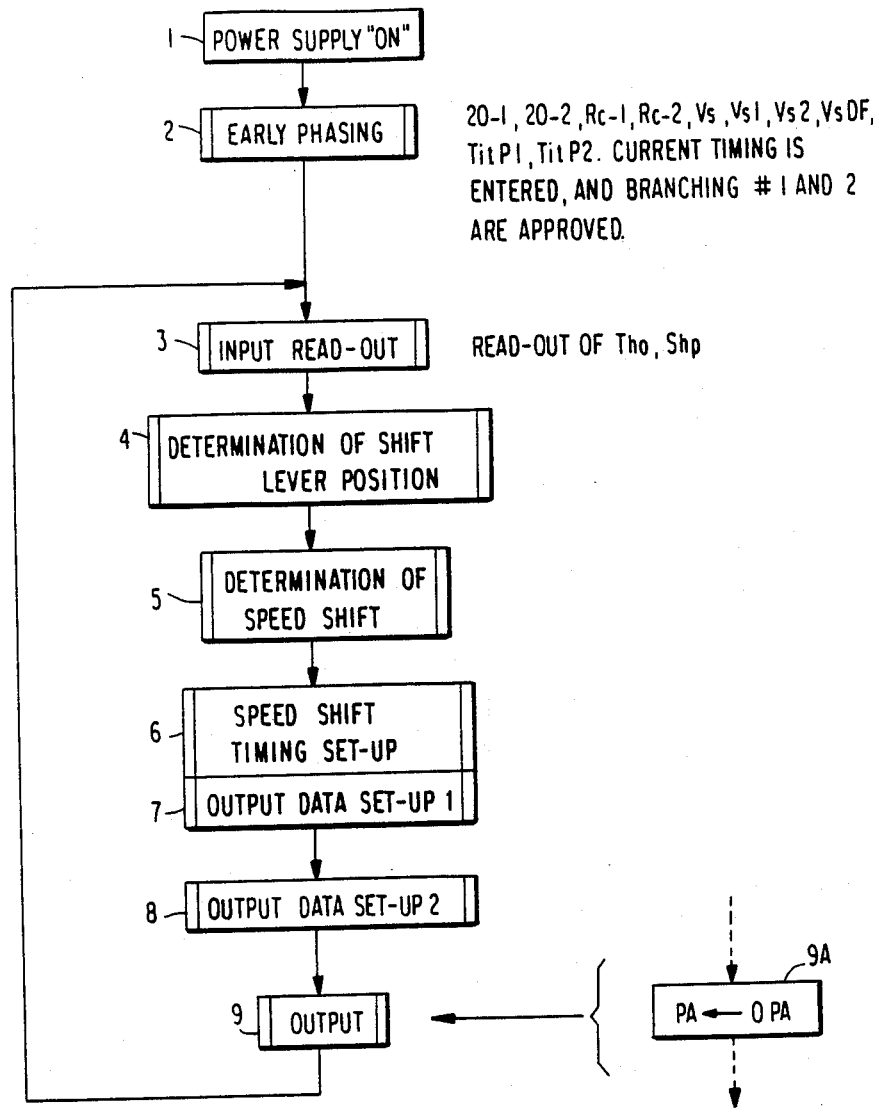
FIG. 2 is a flow chart of the main routine of the microprocessor.

In FIG. 2 a summary of the control operations of CPU 14 are indicated. When the CPU 14 is energized (step 1. The "step" is omitted in the parenthesis hereinafter), it clears internal registers, counters, timers etc. and sets the outport to the output signal level for standby (2). During these beginning stages, the counters 20-1 and 20-2 are cleared, i.e. the clear signal is given, which is synonymous with counter start.

The CPU permits branching #1 and #2, starts internal timer counters, and conducts all other necessary control operations described hereinafter which are needed in the first stage.

Figure 3A:
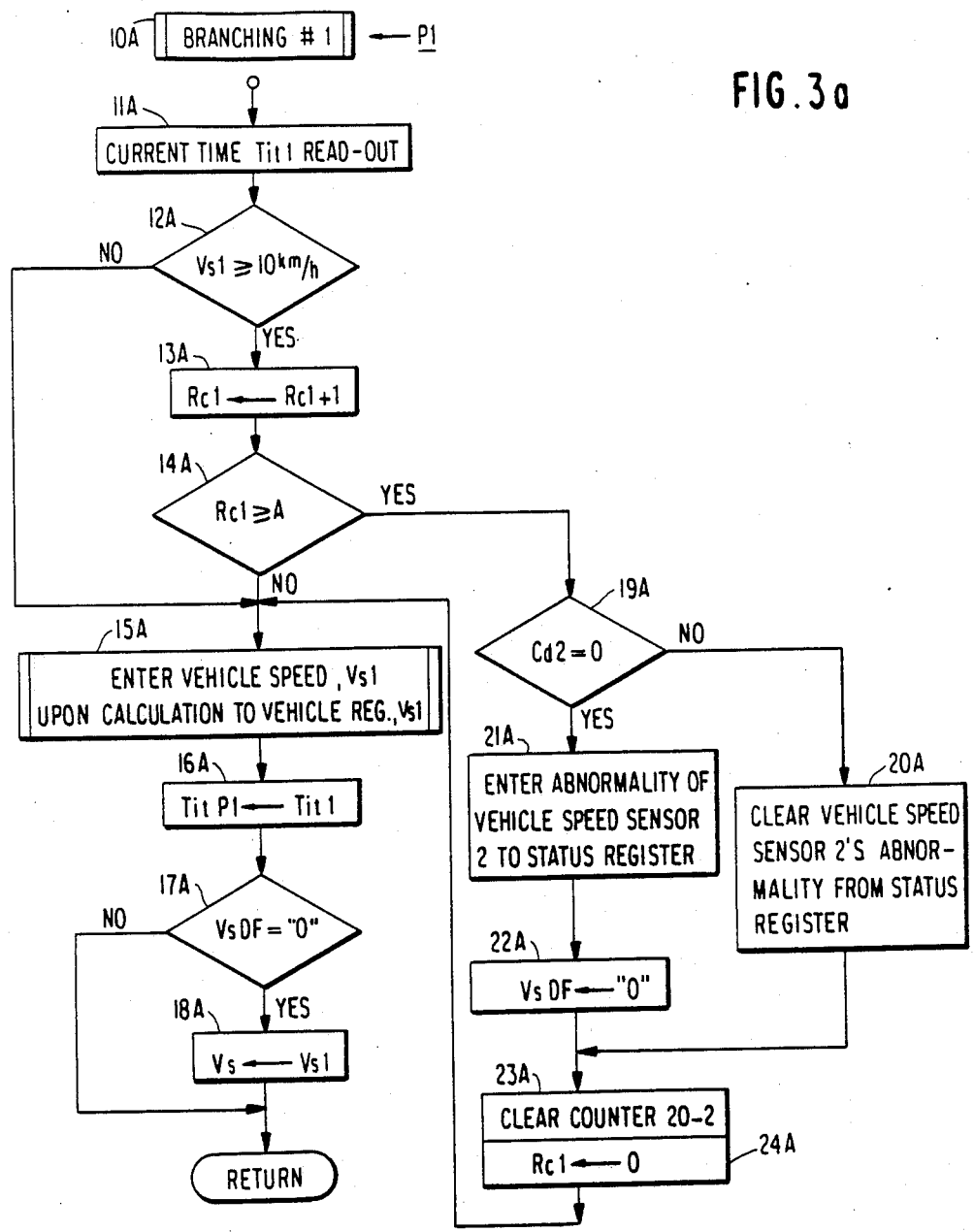
FIG. 3a is a flow chart of the routine for one branch treatment of pulse P1.
Figure 3B:
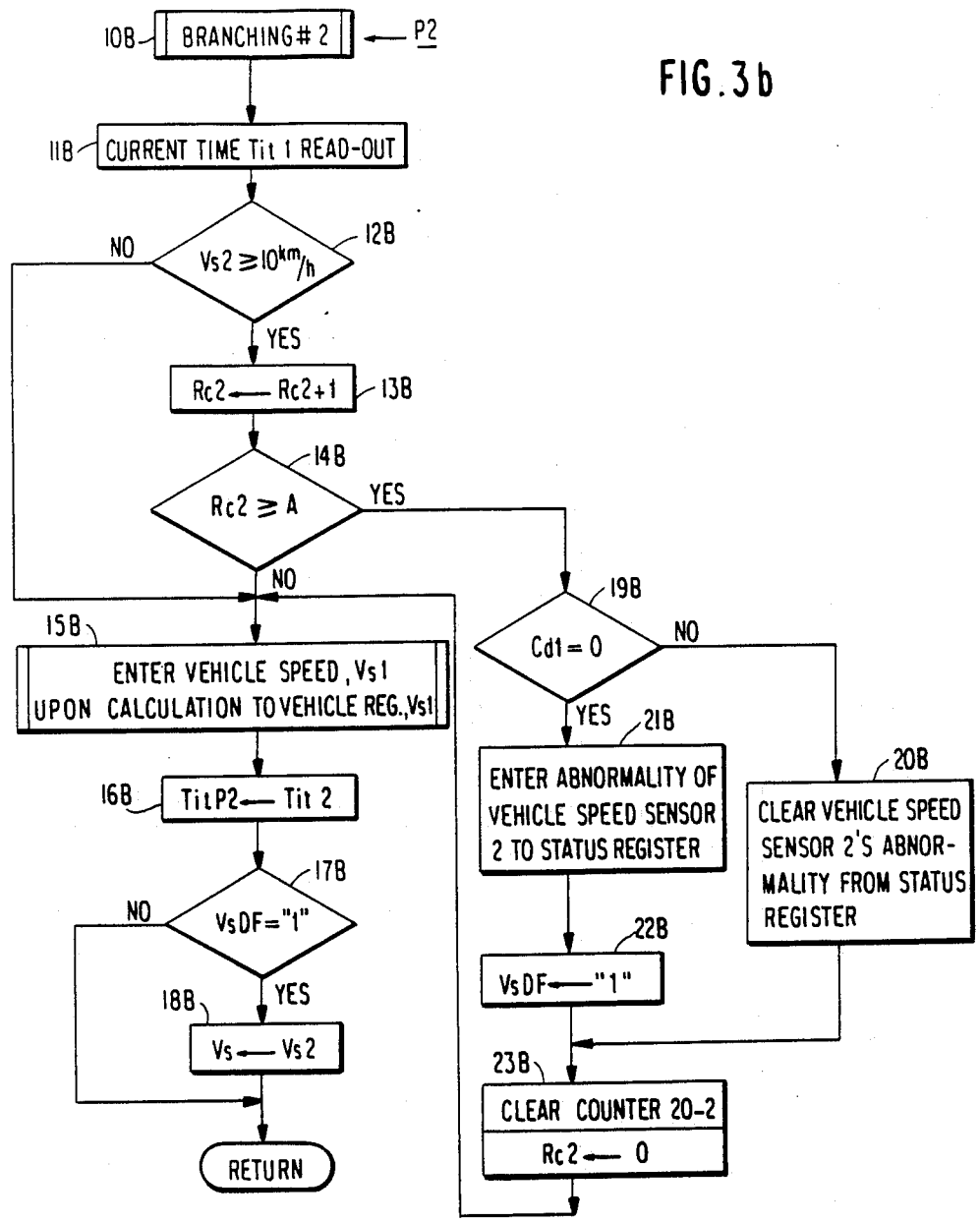
FIG. 3b is a flow chart of the routine for a second branch treatment of pulse P2.

Then CPU 14 starts to read in information such as input data, Tho, Shp, and other data required for speed variation control (3), determines shift lever positioning (4), determines speed variation (5), prepares output data 1 (7), prepares output data 2 (8), and executes the sub-routine of the output (9), and executes the reading of inputs and cyclically execute the sequences of 3-9, 3-9, 3-9 ... During these sequences, when output P1 of the vehicle speed pulse generator 1 declines from H to L, the branching #1 (10A) in FIG. 3a is executed and when output P2 of the vehicle speed pulse generator 2 declines from H to L, the branching #2 (10b) in FIG. 3b is executed branching #1 (10A) in FIG. 3a is explained as follows. It should be noted that the "branching 1" is executed every time pulse P1 is generated.

When the output (P1) of the vehicle speed pulse generator 1 declines from H to L, CPU 14 reads out the current time Tit 1 from the timing counter (11A), and checks if the vehicle speed value Vs1 of the vehicle speed register VS 1 is higher than 10 Km/h (12A). Should it be higher than 10 Km/h, the content of the branching cycle register is changed from Rc1+1 to Rc1 (13A) and checks if the changed value Rc1 is bigger than the specified number A (14A). If it is bigger than the specified number A, the count data Cd2 of the counter 20-2 is checked to see if it is "0" or not. If the count data is not "0", the memory range is cleared which stores the vehicle speed sensor 2 abnormality data (20A), clears (or restarts) the counter 20-2 (23A), clears the branching cycle register, RC 1 (24A), and enters the vehicle speed Vs1 calculated at the time, to the vehicle speed register Vs1 (15A). The vehicle speed VS 1 is calculated by reduction of the previous value of the timing register, Tit P1, from the value at this time, Tit 1, (Tit 1 -Tit P1:) and the time required for proceeding to the specified distance D:

$$Vs1 = D/(Tit\ 1 - Tit\ P1).$$

When this VS 1 is written into the vehicle register VS 1, the time at this time, Tit 1, is rewritten into the previous time register, Tit P 1 (16A). Then, a check is made if content of the pulse directing register Vs DF is "0" (the collected and directed vehicle speed information based on generated pulse P1 of the first vehicle speed pulse generator (1) (17A), and if so, enter the vehicle speed data Vs 1 of the vehicle speed register Vs1 is entered into the vehicle speed information register, Vs, (18A), and returned to the main routine (FIG. 2) upon completion of treating "the branching #1".

At step 19A, if the counted value of the counter 20-2 is "0", it indicates no pulse P2 is generated while A quantity of pulses P1 are being generated and it indicates the vehicle speed pulse generator 2 has some abnormality and the abnormality in the vehicle speed sensor 2 is entered into the condition register (21A). Then, the pulse directing register VsDF is entered with "0" (it is a synonym of "clear") the collected and directed vehicle speed information based on generated pulse P1 of the first vehicle speed pulse generator 1 and then proceeds to step 23A.

At step 12A, if content of the vehicle speed register Vs1 is shown as less than 10 Km/h, proceed to step 15A from step 12A, and calculate the vehicle speed Vs1 without implementing steps 13A, 14A, 19A-24A.

Based on the repeated execution of one pulse of pulse P1 of the "branching #1" (decreasing from H to L) as sequenced and explained above, if the count data Cd2 (this is the number of pulse P2, X2, during A quantity of P1 pulses generated) of the counter 20—2 while A number of pulses P1 are generated while vehicle speed Vs1 is kept higher than 10 Km/h, and the counter 20-2 is restarted indicating Cd2 is higher than 1, instead of 0 or less than 1; this confirms pulses P2 are generated in a normal condition and data showing abnormality of the vehicle speed sensor 2 of the status register is cleared. If Cd2 is 0, pulses P2 are not generated (due to an abnormality of the vehicle speed pulse generator 2), the vehicle speed Vs 1, being calculated based on pulses P1 is entered into the vehicle speed information register Vs.

Thus "the branching #1" not only calculates vehicle speed Vs 1 based on pulse P1 but also detects an abnormality in the vehicle speed pulse generator 2 and when the vehicle speed pulse generator 2 is detected as abnormal, the abnormality of the vehicle speed sensor is entered into the status register and vehicle speed Vs 1 calculated based on pulse p1 of the first vehicle speed pulse generator 1 is entered into the vehicle speed information register Vs.

The "branching #2", shown in drawing 3b, functions similar to the aforementioned "branching #1" responsive to pulse P2 and not only calculates vehicle speed Vs2 based on pulse P2 but also detects an abnormality in the vehicle speed pulse generator 1, in the same way described above. When an abnormality is detected in the vehicle speed pulse generator 1, the abnormality of the vehicle speed sensor 1 is entered into the status register Vs while the vehicle speed Vs 2 is calculated based on the generated pulse P2 of the second vehicle speed pulse generator 2 and is entered into the vehicle speed information register.

Based on the treatment of the "branching #1" and "branching #2" as explained above, any abnormality in the vehicle speed pulse generators 1 and 2 is detected. When the generators 1 and 2 normally operate as evidenced by power supply "ON" in the CPU 14, the content of the pulse directing register VsDF remains as "0" (the vehicle speed information collection directive) and Vs1 is repeatedly renewed and memorized to the vehicle speed information register Vs, whenever P1 is generated. Thereafter, when an abnormality is detected at the first vehicle speed pulse generator 1 in the "branching #2" (FIG. 3b), the information showing an abnormality is entered into the status register, the content of the pulse directing register VsDF is changed to "1", and the vehicle speed Vs2 is renewed and reentered being calculated based on the generated pulse P2 of the normal second vehicle speed pulse generator into the vehicle speed information register Vs whenever P2 emerges.

If the first vehicle speed pulse generator 1 is later detected as normal, the information of abnormality in the vehicle speed sensor 1 is erased from the status register. However, the content of the pulse directing register VsDF remains as "1", vehicle speed Vs2 being calculated by pulse P2 is renewed and reentered into the vehicle speed information register, whenever P2 emerges. When the content of the pulse directing register VsDF is "1" and an abnormality is detected at the second vehicle speed pulse generator 1 in "branching #1" (FIG. 3a), information on the abnormality of the vehicle speed sensor 2 is entered into the status register, the content of the pulse directing register VsDF is changed to "0", and the vehicle speed, Vs1, which was calculated based on the generated pulse "1" of the normal first vehicle speed pulse generator, is renewed and reentered whenever P1 appears. Thereinafter, if the second vehicle speed pulse generator 2 is detected as normal, the entry of an abnormality in the second vehicle speed pulse generator 2 will be erased, while content "0" and vehicle speed Vs1 which is calculated based on P1 whenever the pulse is emerged, is renewed at the vehicle speed information register.

As described above, if the vehicle speed generator 1 is detected as abnormal, the information showing abnormality of the vehicle speed sensor 1 is entered into the condition register and information of the pulse directing register VsDF is "1", and similarly vehicle speed Vs2 which is calculated based on the generated pulse P2 of the normal vehicle speed pulse generator 2 is entered into the vehicle speed information register Vs. When an abnormality in the vehicle speed pulse generator 2 is detected, information of abnormality of the vehicle speed sensor 2 is entered into the condition register and information of the pulse directing register VsDF is "0".

Responsive to the above, the vehicle speed Vs1 calculated based on the generated pulse P1 of the normal vehicle speed pulse generator 1 is entered into the vehicle speed information register Vs. For the determination of speed variation (5), the speed shift of a successive step should be determined in accordance with the speed shift presently applied to the speed variator 9, the opening of slot Tho, vehicle speed and shift lever position Shp.

For this purpose, vehicle speed should utilize data Vs of the aforementioned vehicle speed information register Vs. For the timing of speed variation (8), the speed shift presently applied, the speed shift to be applied in a successive step and vehicle speed Vs are considered for determining timing of speed variation. To set up output data (7), based on the determined timing, data to be output is provided to the output register but does not execute output.

Figure 4:
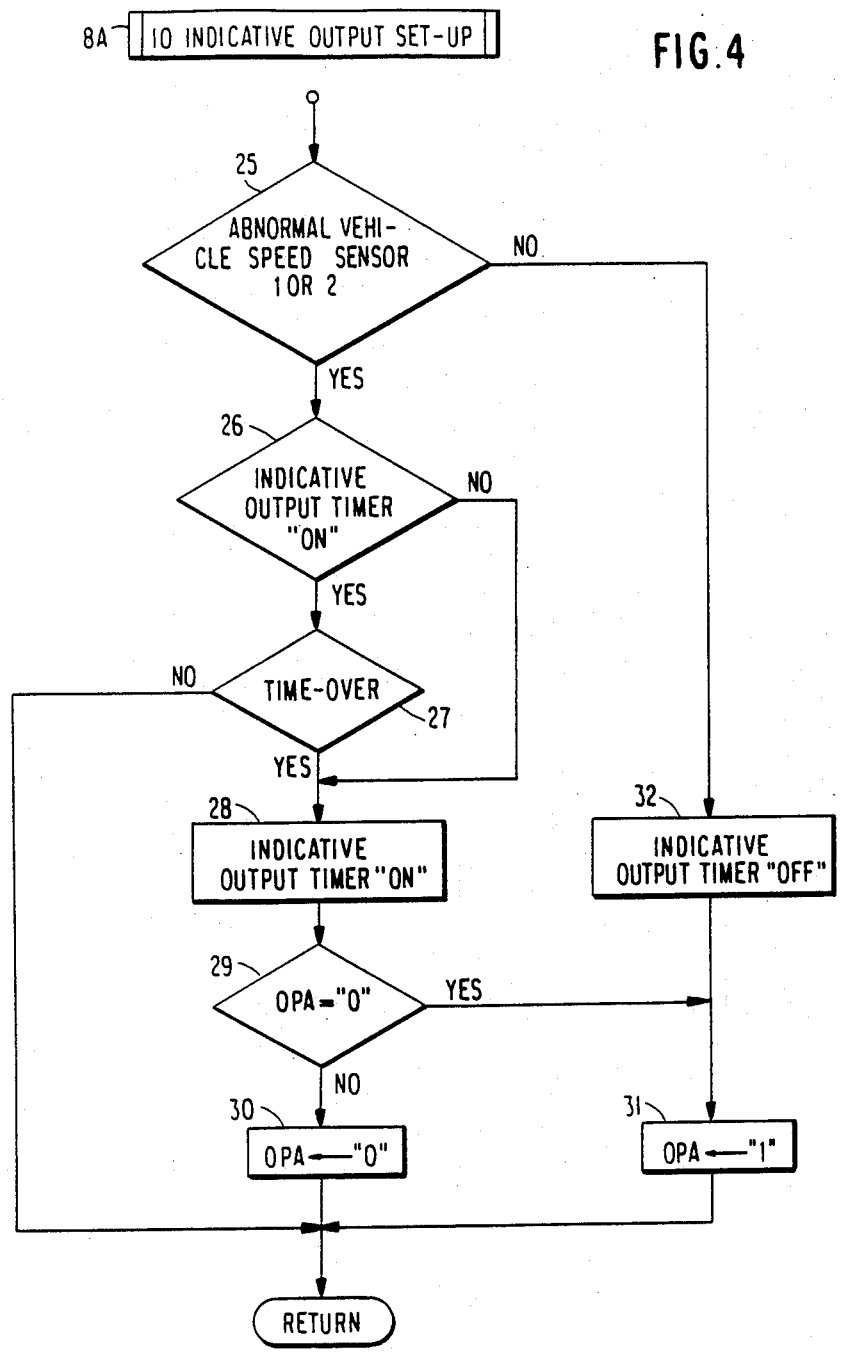
FIG. 4 is a flow chart of a sub routine for the output of data Set-up in FIG. 2.

To set up output data (2), notifying output data is prepared based on abnormality detection data, output data is modified based on a fail-safe reliability factor etc., and output data provided at the output register are fed to the output port. In FIG. 4 "vehicle sensor 1 abnormality" and "vehicle sensor 2 abnormality" of the status register in the output data set-up 2 (8) are shown with the output data set-up operation of ten (10) vehicle speed pulse warning lamps, i.e. "10 indicative output set-up" (8A) are indicated. At this operation, if data showing "Vehicle Speed Sensor 1 abnormality" or "vehicle speed sensor 2 abnormality" at the status register are checked and if at least one of two is there, check is needed to see if the indicating output timer is started ("ON") to set up light on-off cycle (25). If not started, it indicates it is first time after detection of an abnormality. Therefore, the indicating output timer is started (28) and "0" is entered to the output register OPA at step 30 via step 29. Then, returning to main-routine shown in FIG. 2, content "1" of the output register OPA or the output (9), is red to the output port PA which lights the lamps (10). When proceedings reached "10 Indicating Output Set-Up" (8A) of "Output data set-up 2" (8) via step 4–7, and after returning to the input read-out (3) from output (9), the indicating output time is already being started at step 26 in FIG. 4 and a check is made to see if the time is over (27). If the time is over, the indicating output timer is started (28), and content of the output register OPA is reversed (29–31).

By executing above, as long as there are "Abnormal vehicle speed sensor 1" and "Abnormal vehicle speed sensor 2" at the status register, the lamps 10 are lit for the set time (the time set at the aforementioned indicating output timer) and are put off for the set time, repeating the sequences, thus evidencing abnormality in the vehicle speed sensors.

"Abnormal vehicle speed sensor 1" and "Abnormal vehicle speed sensor 2" are erased from the status register, the indicative output timer is reset (32 FIG. 4), 1 is entered to the output register, OPA, which is fed (9) into the output port PA and lamps 10 are extinguished.

When the aforementioned abnormality information is absent, "10 indicative output set-up" (8A) is executed by steps 25–32-31, the output port PA is fed with "1", and lamps are not lit. As described in the example, functionality of both vehicle speed pulse generators 1 and 2 are constantly being supervised and if one side become abnormal, lamp 10 is "ON" and "OFF", and speed variation is accomplished based on vehicle speed Vs being calculated by the generated pulse of the other normal generator. This kind of judgement for abnormality is done only while vehicle speed is kept higher than 10 Km/h and abnormality notice is not expected when pulse generation is obscure as when both vehicle speed pulse generators 1 and 2 are normal and the speed is extremely slow.

In this example, the vehicle speed pulse generators are equally treated with same weight and two sets of the counter systems (16-1~20-1 and 16-2~20-2) are provided, thus enabling close and parallel supervision with respect to the abnormality of both vehicle speed pulse generators 1 and 2. To make it simpler, one set of the composite device of the abnormality detecting logic could be eliminated, by making the eliminating system (example 16-2~20-2) to become an auxiliary to the main (example 16-1~20-1). In this method, all the steps of detecting an abnormality of pulse P2, in "the branching 1", may be shunt off. Also in this example, in addition to micro-processor 14, two (2) sets of pulses counter systems (16-1~20-1 and 16-2~20-2) are provided. However, one or both systems may be eliminated to be consolidated to the micro-processor 14. To eliminate both systems together, Cd2 is cleared by inserting step of "two increments in contents of the register Cd1" between step 13A and 14A in the branching 1 (FIG. 3a), and Cd1 is cleared by inserting step of "two increments in contents of the register Cd2", between step 13B and 14B in the branching 2. Though it is designed to count-up to 2 for 1 pulse generated in the pulse counting system (16-1~20-1 and 16-2~20-2), it may be converted, so that 1 or 3 or more count-up for 1 generated pulse.

If one side of the vehicle speed pulse generator (1) is in trouble electrical pulse P1 is not generated, and the counted value (Cd1) become "0"or less than "1" despite the vehicle speed being higher than a specified value, while the other vehicle speed pulse generator 2 generates the specified numbers of pulses P2. At the same time, the abnormality detecting method (14) generates abnormality information (abnormal vehicle speed sensor), the notice method (10) notifies the abnormality, and the transfer method (14) transfers the electrical pulse that is the basis of calculating vehicle speed, to generated pulses P2 of the other vehicle speed pulse generator (2), while vehicle speed Vs is calculated based on the generated pulses P2 by the other, normal vehicle speed pulse generator (2), and the memory method (14) memorize this vehicle speed information Vs.

Accordingly, an abnormality is detected at one vehicle speed pulse generator 1 the abnormality is notified, and the memory method is to memorize the information, Vs 2, of correct vehicle speed (Vs) which is calculated based on the generated pulse, P2, by the other, normal vehicle speed pulse generator, 2.

This vehicle speed information ($V_s = V_{s2}$) of the memory method, is utilized as feedback data required for fixed operating speed control, speed shift control, and/or anti-skid brake pressure control etc., and normal control is feasible and the abnormality in the vehicle speed pulse generator 1 is noted, despite the abnormality in the vehicle speed pulse generator 1.

When vehicle speed is less than a specified value, one or both of the first and second vehicle speed pulse generators 1 and 2 employs a rotary encoder using a permanent magnet, and the electrical pulse is not generated or obscure, the abnormality information is detected by the abnormality detecting method unless vehicle speed is higher than the specified speed, no false abnormality notice be executed. If the rotary encoder using a permanent magnet does not generate an electrical pulse or the generated pulse is obscure due to low vehicle speed, control can be performed with no problem, since the vehicle speed is considered "0" for the purpose of speed shift control, fixed operating speed control, anti-skid brake pressure control and the like.

What is claimed is:

1. A vehicle speed detecting device comprising first and second vehicle speed pulse generators, each of which provides electrical pulses proportionate to the vehicle speed, vehicle speed calculation means for calculating the vehicle speed based on said electrical pulses, means for memorizing the vehicle speed, means for counting the pulses generated by said vehicle speed pulse generators, abnormality detecting means for producing an abnormal operation signal when the count value of one of said vehicle speed pulse generators is lower than a predetermined value when the vehicle speed calculated by the vehicle speed calculation means is greater than the predetermined vehicle speed, means for transferring the electrical pulses for the calculation of the vehicle speed from one pulse generator to the other pulse generator and means for initiating an alarm in response to the abnormality signal.

2. A method for detecting the abnormality of one of a pair of vehicle speed pulse generators comprising counting electrical pulses generated by first and second vehicle speed pulse generators, generating a first abnormality signal when the count value of the first vehicle speed pulse generator is lower than a specified value and generating a second abnormality signal when the count value of the second vehicle pulse generator is lower than a specific value, transferring the electrical pulses to be calculated by the vehicle speed calculating means in response to the first abnormality signal from the electrical pulses generated from the first vehicle speed pulse generator to the electrical pulses of the second vehicle speed pulse generator; transferring the electrical pulses to be calculated by the vehicle speed calculating means in response to the second abnormality signal, from electrical pulses generated from the second vehicle speed pulse generator to electrical pulses of the first vehicle speed pulse generator; and initiating an alarm in response to the said abnormality signals.

* * * * *